US012603704B2

(12) United States Patent
Rojas et al.

(10) Patent No.: US 12,603,704 B2
(45) Date of Patent: Apr. 14, 2026

(54) BEACONLESS LASER ALIGNMENT WITH BEAMFORMING

(71) Applicant: Embry-Riddle Aeronautical University, Inc., Daytona Beach, FL (US)

(72) Inventors: Eduardo Antonio Rojas, Port Orange, FL (US); Chengtao Xu, South Daytona, FL (US)

(73) Assignee: Embry-Riddle Aeronautical University, Inc., Daytona Beach, FL (US)

( * ) Notice: Subject to any disclaimer, the term of this patent is extended or adjusted under 35 U.S.C. 154(b) by 365 days.

(21) Appl. No.: 18/192,756

(22) Filed: Mar. 30, 2023

(65) Prior Publication Data

US 2024/0372619 A1      Nov. 7, 2024

Related U.S. Application Data

(60) Provisional application No. 63/325,403, filed on Mar. 30, 2022.

(51) Int. Cl.
| | |
|---|---|
| *H04B 10/00* | (2013.01) |
| *H04B 10/112* | (2013.01) |

(Continued)

(52) U.S. Cl.
CPC ....... *H04B 10/118* (2013.01); *H04B 10/1129* (2013.01); *H04W 76/10* (2018.02)

(58) Field of Classification Search
CPC ... H04B 10/11; H04B 10/112; H04B 10/1121; H04B 10/1123; H04B 10/1125;

(Continued)

(56) References Cited

U.S. PATENT DOCUMENTS

| | | | |
|---|---|---|---|
| 6,937,186 | B1 | 8/2005 | Dybdal et al. |
| 8,094,081 | B1 | 1/2012 | Bruzzi et al. |

(Continued)

OTHER PUBLICATIONS

Baister, G., et al., "Pointing, acquisition and tracking for optical space communications", Electronics Communication Engineering Journal, 6(6), (Dec. 1994), 10 pages.

(Continued)

*Primary Examiner* — Hanh Phan
(74) *Attorney, Agent, or Firm* — Schwegman Lundberg & Woessner, P.A.

(57) ABSTRACT

A beaconless alignment approach can be used such as to facilitate establishment of an optical communication link or to enhance reliability of such an optical communication link. When laser-based free-space optical communication is used, such an approach can be referred to as an agile beaconless laser beam alignment (ABLBA) technique. Such an ABLBA technique can consume less scanning time as compared to other approaches and can be used for alignment in relation to establishing an optical communication link between stations, such as between satellites. For example, at a transmitting station, a non-optical beam can be scanned according to a first specified search pattern within an initial search field, and an optical field can be scanned according to a second specified search pattern within a refined search field, the refined search field established at least in part using an alignment identified from the scanning of the non-optical beam.

20 Claims, 10 Drawing Sheets

(51) Int. Cl.
    *H04B 10/118*       (2013.01)
    *H04W 76/10*       (2018.01)

(58) Field of Classification Search
    CPC ............ H04B 10/1127; H04B 10/1129; H04B
                10/114; H04B 10/1143; H04B 10/1149;
                H04B 10/25753; H04B 10/0795; H04B
                10/40; H04B 10/118; H04N 10/118
    USPC ....... 398/118, 119, 120, 121, 122, 123, 124,
                398/125, 126, 127, 128, 129, 130, 131,
           398/115, 116, 117, 33, 38, 135, 136, 158,
                             398/159, 25, 26, 27
    See application file for complete search history.

(56) References Cited

U.S. PATENT DOCUMENTS

| | | | | |
|---|---|---|---|---|
| 8,942,562 | B2 * | 1/2015 | Pusarla ................ | H04B 10/112 |
| | | | | 398/115 |
| 8,988,754 | B2 | 3/2015 | Sun et al. | |
| 9,264,137 | B2 * | 2/2016 | Saint Georges ... | H04B 10/1125 |
| 9,270,372 | B2 * | 2/2016 | Miniscalco ........ | H04B 10/1129 |
| 9,413,461 | B2 | 8/2016 | Chao et al. | |
| 9,813,151 | B2 | 11/2017 | Kingsbury et al. | |
| 9,966,658 | B2 | 5/2018 | Fitz-coy et al. | |
| 11,115,119 | B1 * | 9/2021 | Lee .................... | H04B 7/18519 |

OTHER PUBLICATIONS

Bashir, Muhammad S., et al., "Adaptive acquisition schemes for photon-limited free-space optical communications", IEEE Transactions on Communications, 69(1), (Jan. 2021), pp. 416-428.

Bashir, Muhammad S., et al., "Cramer-Rao Bounds for Beam Tracking With Photon Counting Detector Arrays in Free-Space Optical Communications", IEEE Open Journal of the Communications Society, 2, (May 10, 2021), pp. 1065-1081.

Bashir, Muhammad S., et al., "Optical Beam Position Tracking in Free-Space Optical Communication Systems", IEEE Transactions on Aerospace and Electronic Systems, 54(2), (Jul. 4, 2017), pp. 520-536.

Farid, Ahmed A., "Outage Capacity Optimization for Free-Space Optical Links With Pointing Errors", Journal of Lightwave Technology, 25(7), (Jul. 2007), pp. 1702-1710.

Gatsonis, Nikolaos A., et al., "Micropulsed Plasma Thrusters for Attitude Control of a Low-Earth-Orbiting CubeSat", Journal of Spacecraft and Rockets, 53(1), (Jan.-Feb. 2016), pp. 57-73.

Greenfell, Peter, et al., "Pointing, Acquisition, and Tracking for Small Satellite Laser Communications", SSC18-WKI-01, 32nd Annual AIAA/USU Conference on Small Satellites, (2018), pp. 1-7.

Inamdar, Niraj K., et al., "Small Satellite Optical Communication Networks: Analytical Models", arXiv preprint arXiv:1807.10393, (Aug. 29, 2018), pp. 1-21.

Kaadan, Asaad, et al., "Spherical FSO Receivers for UAV Communication: Geometric Coverage Models", IEEE Transactions on Aerospace and Electronic Systems, 52(5), (Oct. 2016), pp. 2157-2167.

Kaymak, Yagiz, et al., "A Survey on Acquisition, Tracking, and Pointing Mechanisms for Mobile Free-Space Optical Communications", IEEE Communications Surveys & Tutorials, 20(2), (2018), pp. 1104-1123.

Khalighi, Mohammad Ali, et al., "Survey on free space optical communications. A communication theory perspective", IEEE Communication Surveys Tutorials, 16(4), (2014), pp. 2231-2258.

Li, Xin, et al., "Analytical expression and optimization of spatial acquisition for intersatellite optical communications", Optics Express, 19(3), (Jan. 25, 2011), pp. 2381-2390.

Madni, Mohamed A., et al., "Energy-Aware Routing for CubeSat Swarms", International Journal of Digital Information and Wireless Communications (IJDIWC), 8(3), (2018), pp. 150-155.

Maletsky, Lorin P., et al., "Accuracy of an optical active-marker system to track the relative motion of rigid bodies", Journal of Biomechanics, 40(3), (2007), pp. 682-685.

McDowell, Jonathan C., "The Low Earth Orbit Satellite Population and Impacts of the SpaceX Starlink Constellation", The Astrophysical Journal Letters 892(2): L36, (Apr. 1, 2020), pp. 1-10.

McGrath, Ciara N., et al., "General perturbation method for satellite constellation reconfiguration using low-thrust maneuvers", Journal of Guidance, Control, and Dynamics, 42(8), (Aug. 2019), pp. 1676-1692.

Puig-Suari, Jordi, et al., "Development of the Standard CubeSat Deployer and a CubeSat Class PicoSatellte", 2001 IEEE Aerospace Conference Proceedings (Cat. No. 01TH8542), vol. 1, (2001), 7 pages.

Selva, Daniel, et al., "A survey and assessment of the capabilities of Cubesats for Earth Observation", Acta Astronautica 74, (2012), pp. 50-68.

Spiller, Dario, et al., "Minimum-Time Reconfiguration Maneuvers of Satellite Formations Using Perturbation Forces", Journal of Guidance, Control, and Dynamics, 40(5), (2017), 1130-1143.

Toorian, Armen, et al., "The Cubesat Approach to Space Access", 2008 IEEE Aerospace Conference, (2008), pp. 1-14.

Villela, Thyrso, et al., "Towards the Thousandth CubeSat: A Statistical Overview", International Journal of Aerospace Engineering vol. 2019, Article ID 5063145, (Jan. 10, 2019), 13 pages.

Xu, Chengtao, et al., "Agile Beaconless Laser Beam Alignment with Adaptive Mm-Wave Beamforming for Inter CubeSat Communication", 2022 IEEE International Conference on Space Optical Systems and Applications (ICSOS), (Mar. 28, 2022), pp. 218-223.

Xu, Guanjun, et al., "Mixed RF/FSO Deep space Communication System Under Solar Scintillation Effect", IEEE Transactions on Aerospace and Electronic Systems, 57(5), (Oct. 2021), pp. 3237-3251.

\* cited by examiner

BEACONLESS LASER ALIGNMENT WITH BEAMFORMING

CLAIM OF PRIORITY

This patent application claims the benefit of priority of Rojas et al., U.S. Provisional Patent Application No. 63/325,403, titled "BEACONLESS LASER ALIGNMENT WITH ADAPTIVE MM-WAVE BEAMFORMING," filed on Mar. 30, 2022, which is hereby incorporated by reference herein in its entirety.

FIELD OF THE DISCLOSURE

This document pertains generally, but not by way of limitation, to optical communication, and more particularly to optical beam alignment for facilitating such optical communication such as for inter-satellite communication or for other applications.

BACKGROUND

Inter small satellite or "CubeSat" communication (C2C) can be used for configuring low earth orbit satellite constellations. In one communication approach, directional laser links for C2C allow high-data-rate communication with low delay and power consumption as compared to other approaches. However, a pointing loss from imperfect acquisition or tracking for an optical communication channel between satellites with different relative velocities can hinder reliability or even inhibit establishment of a communication link.

SUMMARY OF THE DISCLOSURE

The present inventors have recognized, among other things, that a beaconless alignment approach can be used such as to facilitate optical communication link establishment or to enhance reliability of such an optical communication link. When laser-based free-space optical communication is used, such an approach can be referred to as an agile beaconless laser beam alignment (ABLBA) technique. Such an ABLBA technique can consume less scanning time as compared to other approaches and can be used for alignment in relation to establishing an optical communication link between stations, such as between satellites. A beamforming approach can be used, such as at or near a millimeter-wave (mm-wave) wavelength, and such as implemented using a uniform phased array (UPA) antenna topology. The beamforming approach can be used to establish a half power beam width (HPBW) to guide a laser beam to achieve mutual alignment. Various HPBWs can be generated using different transmitter configurations such as depending on power consumption and delay constraints. Generally, the approaches described herein can facilitate acquisition to support optical communication in the presence of rigid body perturbation of orbital bodies such as CubeSat nodes or relays. The techniques described herein are generally applicable to free-space optical beam alignment between stations. Illustrative examples herein include applications related to CubeSat communication.

As an example, a machine-implemented method can be used for establishing a free-space optical communication link between stations, the machine-implemented method comprising, at a transmitting station, scanning a non-optical beam according to a first specified search pattern within an initial search field, identifying a first alignment corresponding to the non-optical beam intercepting a receiving station, at the transmitting station, scanning an optical field according to a second specified search pattern within a refined search field, the refined search field established at least in part using the identified alignment, and identifying a second alignment corresponding to the optical field intercepting the receiving station.

As an example, a machine-implemented method can be used for establishing a free-space optical communication link between stations, the machine-implemented method comprising determining an initial search field for use by a first station in establishing the free-space optical communication link with a second station, scanning a non-optical beam from a non-optical wireless transmitter of the first station according to a first specified search pattern within the initial search field, receiving a first indication from the second station that the non-optical beam has intercepted the second station, using data about the received first indication from the second station to establishing a refined search field for use by the first station in establishing the free-space optical communication link with the second station, scanning an optical field of an optical system of the first station according to a second specified search pattern within the refined search field, and receiving a second indication from the second station that the optical field is aligned with an optical system of the second station.

A system or other apparatus can be used for performing a portion or an entirety of a machine-implemented method as described herein. For example, an apparatus can be used for establishing a free-space optical communication link between stations, the apparatus comprising a first station comprising a first non-optical wireless transmitter configured to steer a non-optical beam according to a first specified search pattern within an initial search field, a first radio frequency transceiver configured to receive a first indication from a second station that the non-optical beam has intercepted the second station, and a first optical system configured to provide scanning of an optical field according to a second specified search pattern within a refined search field, the refined search field established using the first indication. The first station is configured to establish the free-space optical communication link when the optical field is aligned with the second station, and generally the free-space optical communication link is laser-based.

This summary is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Satellite or airborne systems can support communication with other systems. For example, inter-small-satellite or "CubeSat" communication (C2C) can be used to establish networks of interconnected satellites in a constellation, such as supporting tens, hundreds, or even thousands of stations. Directional optical (e.g., laser) links for C2C allow high-data-rate communication with low delay and power consumption. The present inventors have recognized, among other things, that a pointing loss from imperfect acquisition and tracking between stations with different relative velocities can inhibit or even prevent the optical links from achieving desired link capacity. The apparatus and techniques herein can be used to provide a beaconless alignment approach that requires less scanning time for alignment between stations, as compared to other approaches. For example, non-optical (e.g., millimeter-wave) beamforming can be performed using a uniform phased array (UPA) antenna can be used, along with a specified half power beam width (HPBW) to guide a laser beam toward another station to achieve mutual alignment. Various HPBW with different transmitter configurations can be used. A tradeoff can exist between UPA antenna configuration (or associated HPBW) and acquisition time. Generally, the apparatus and techniques described herein can reduce a delay associated with acquisition (e.g., alignment) of optical communication systems in the presence of rigid body perturbation.

Figure 1:
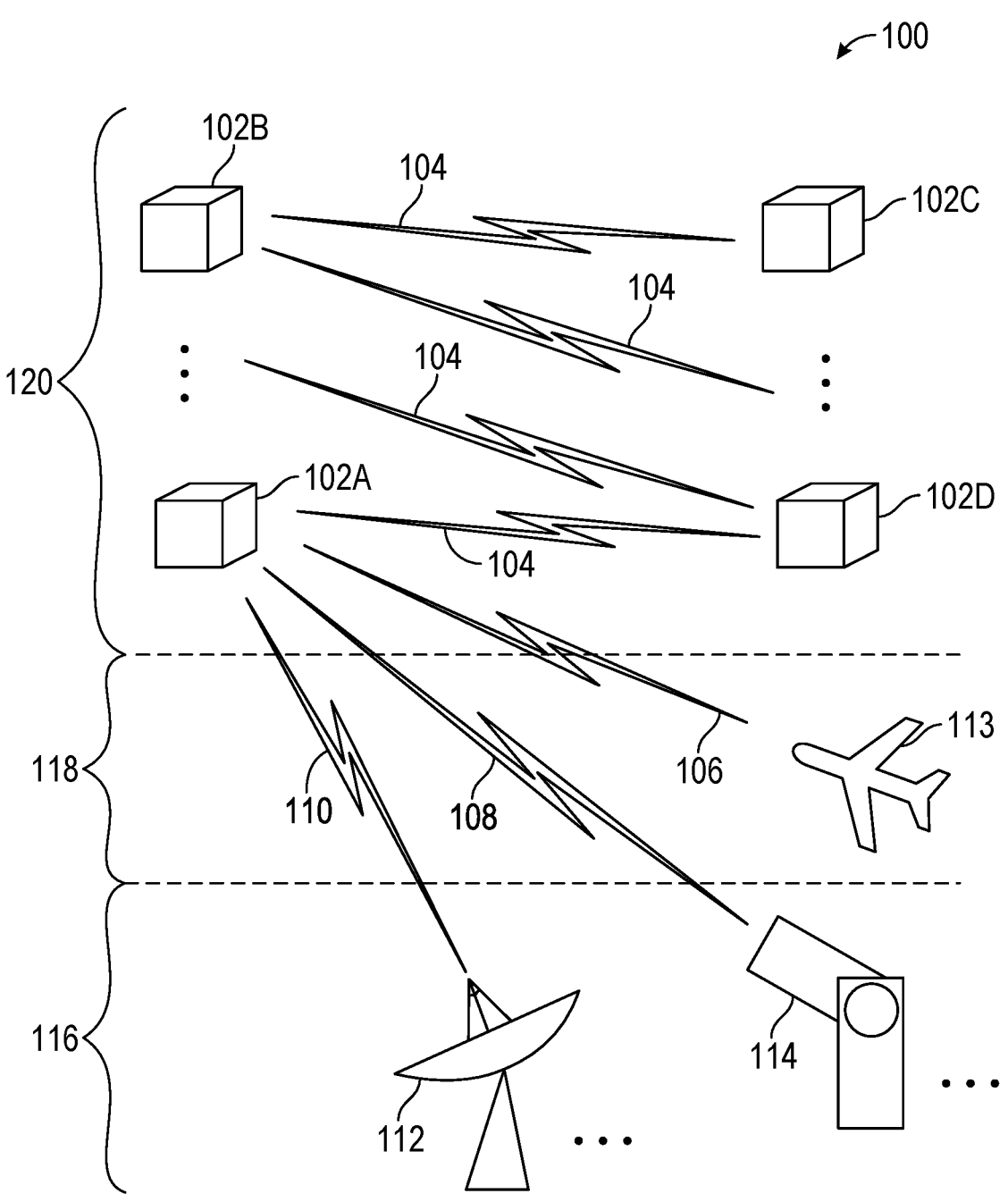
FIG. 1 illustrates generally an example of a system comprising respective stations between which a free-space communication link can be established.

FIG. 1 illustrates generally an example of a system 100 comprising respective stations between which a free-space communication link can be established. For example, such stations can include satellite stations (e.g., CubeSat stations such as respective stations 102A, 102B, 102C, and 102D) located in an orbital region 120. Such satellite stations can communicate with each other or with other elements in the system 100. For example, a radio-based ground station 112 (e.g., a microwave or radio-frequency link) can be used to communication with a respective station 102A via a non-optical communication link 110. An optical ground station 114 (e.g., a laser-based ground station) can communicate with the respective station 102A via an optical communication link 108. Other topologies are possible, such as supporting a communication link 106 (either optical or non-optical, or both) between an airborne platform 113, such as located in an atmospheric region 118, and a respective station 102A. Inter-satellite communication can include a free-space optical communication link 104, such as to establish a non-terrestrial network. The free-space optical communication link 104 can be supplemented with or can otherwise be coordinated with non-optical communication between respective stations, such as radio-frequency (RF) communication. Other networks can coexist with the non-terrestrial network. For example, the radio-based ground station 112 or optical ground station 114 can be linked to other infrastructure located in a terrestrial region 116 (e.g., such as integrated with terrestrial network infrastructure). Similarly, the airborne platform 113 can be linked to other airborne, space-based, or terrestrial elements. Generally, the apparatus and techniques described herein are applicable to establishing a free-space optical communication link between stations, and illustrative examples are provided involving satellite-to-satellite communication, though such techniques could also be used in other contexts.

As an illustration, use of free-space optical communication between orbiting stations is generally more energy-efficient than non-optical communication in the space environment, at least for high-data rate communication (e.g., gigabit-per-second data transfer rates) such as for providing communication services to terrestrial, airborne, or space-based clients. Laser or optical beams experience less atmospheric attenuation. Generally, acquisition, pointing, and tracking are three processes of establishing the free-space optical communication link 104 between satellites. Optical communication between stations generally requires alignment between a transmitting beam and a corresponding receiver (e.g., sensor). Such alignment can be affected by perturbation of stations along their respective orbital tracks. For example, optical beam alignment can be affected by transient processes in attitude or altitude control, elastic vibration, thermal deformation of optical assemblies, and noise associated with electronic systems. An uncertainty in station position may lead to poor alignment of an optical beam.

A field where an orbiting station is potentially located can be referred to as a field of uncertainty (FOU). An estimate of a perturbation of the station rigid body can be used to determine the FOU, providing an initial search field for acquisition. In one approach, an optical transmitter can be scanned across the FO until feedback is received from a receiving station that alignment has been achieved. Such an approach can include use of a spiral scanning path over which the transmitting optical system is scanned.

Figure 2:
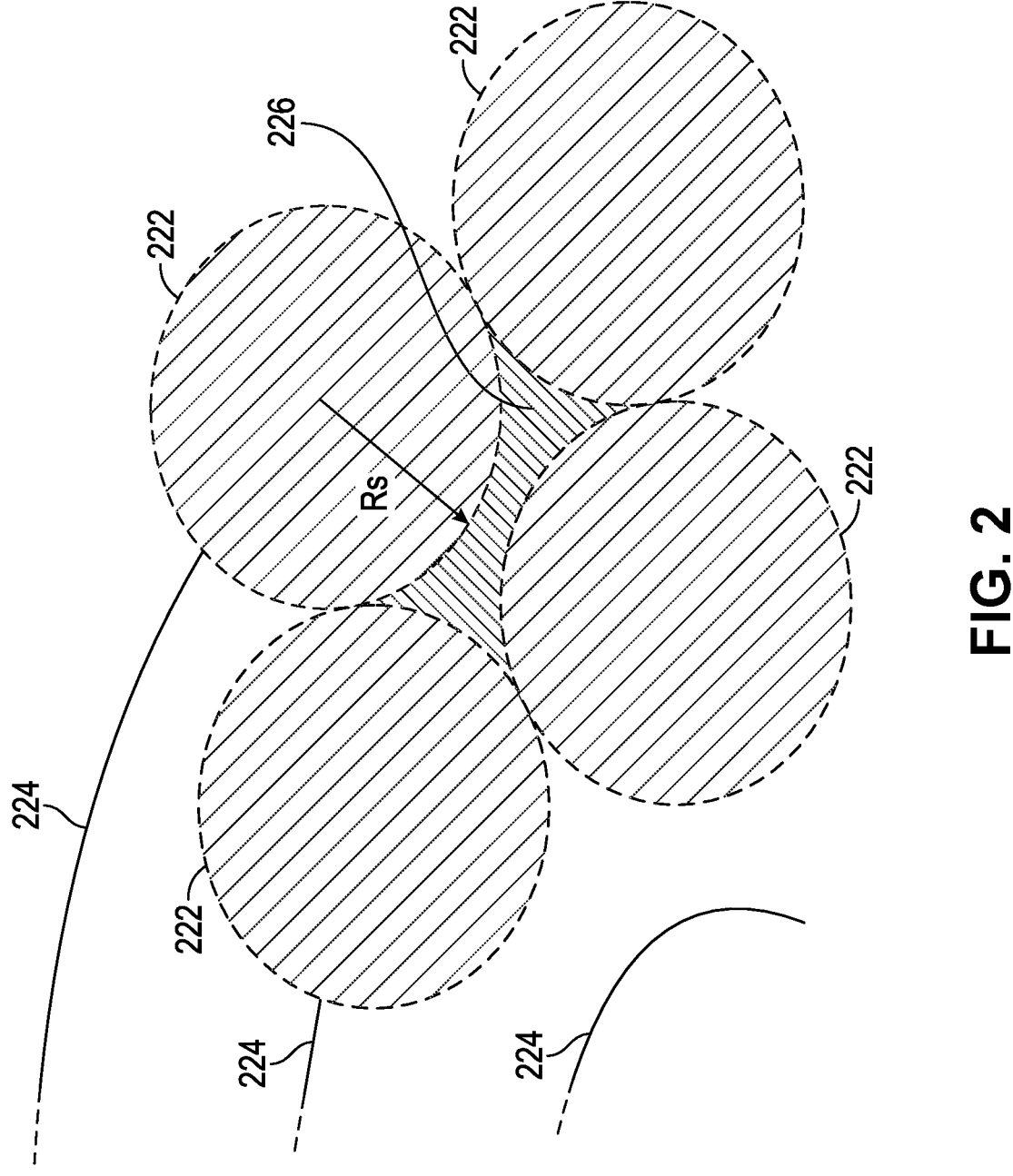
FIG. 2 illustrates generally a scanning approach where respective non-overlapping discrete beam alignments may leave an unscanned region.

FIG. 2 illustrates generally a scanning approach where respective non-overlapping discrete beam alignments 222 may leave an unscanned region (e.g., unscanned field 226). The illustrative example of FIG. 2 shows discrete beam alignments 222 having beam radii such that beam edges are tangent to each other. The unscanned field 226 increases with the size of the radius corresponding to the scanning beam width (e.g., radius "$R_s$"). Discrete scanning steps along the scanning path 224 can be adjusted to provide overlap between adjacent beam alignments 222 to reduce the size of the unscanned field 226. However, such overlap can increase acquisition time in the absence of other approaches, because higher overlap corresponds to a greater count of beam steps to cover the same scanning path 224. Generally, acquisition time can refer to a time duration consumed in identifying an alignment where the transmitter and receiver are mutually aligned to establish a free-space optical communication link. In the example of FIG. 2, scanning can be initiated at a central region of the FOU, proceeding outward in a specified spiral pattern of discrete steps along the scanning path 224.

Figure 3:
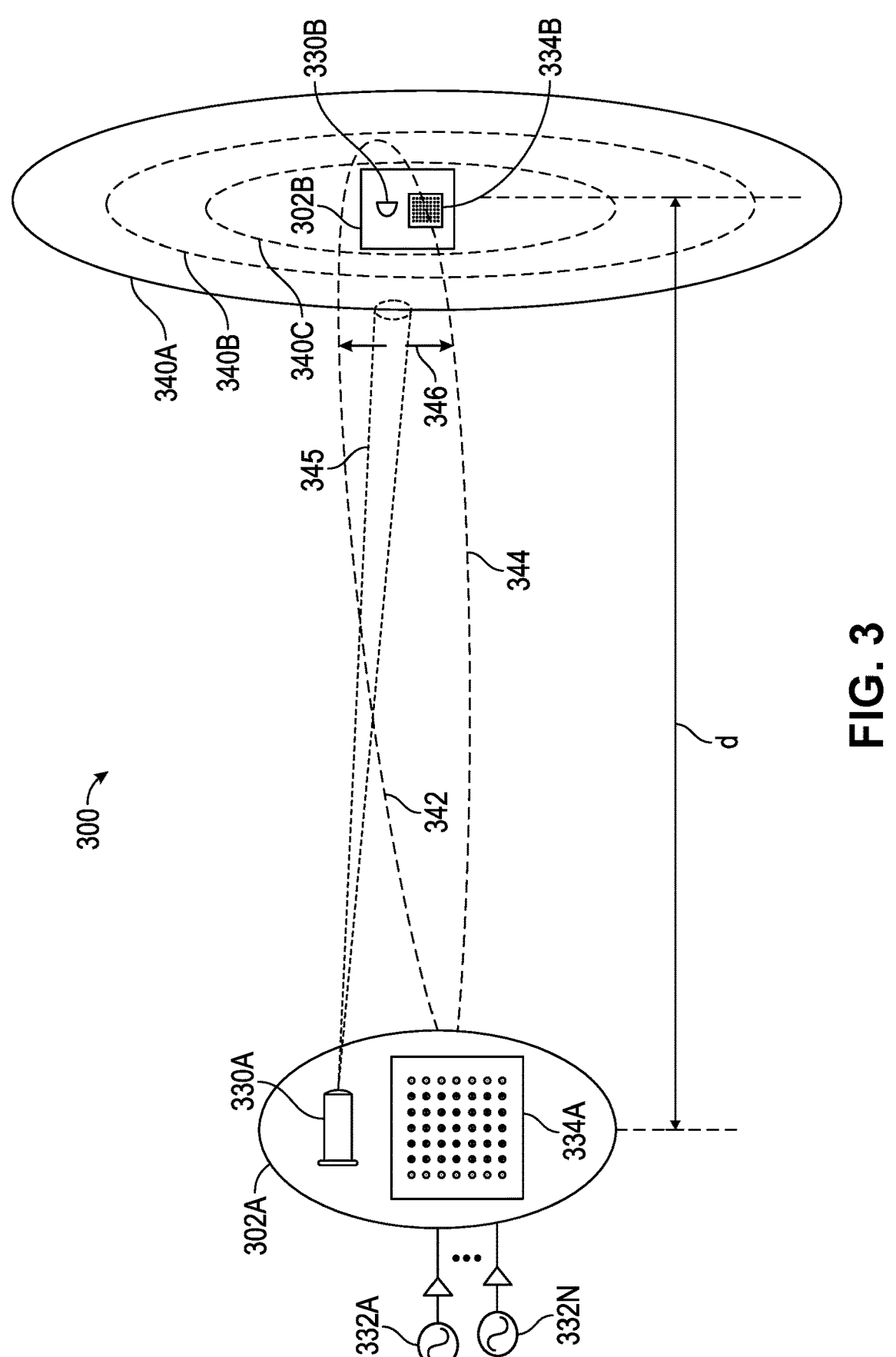
FIG. 3 illustrates generally portions of a system such as including or using a non-optical beam and an optical beam to establish a free-space optical communication link.
Figure 4:
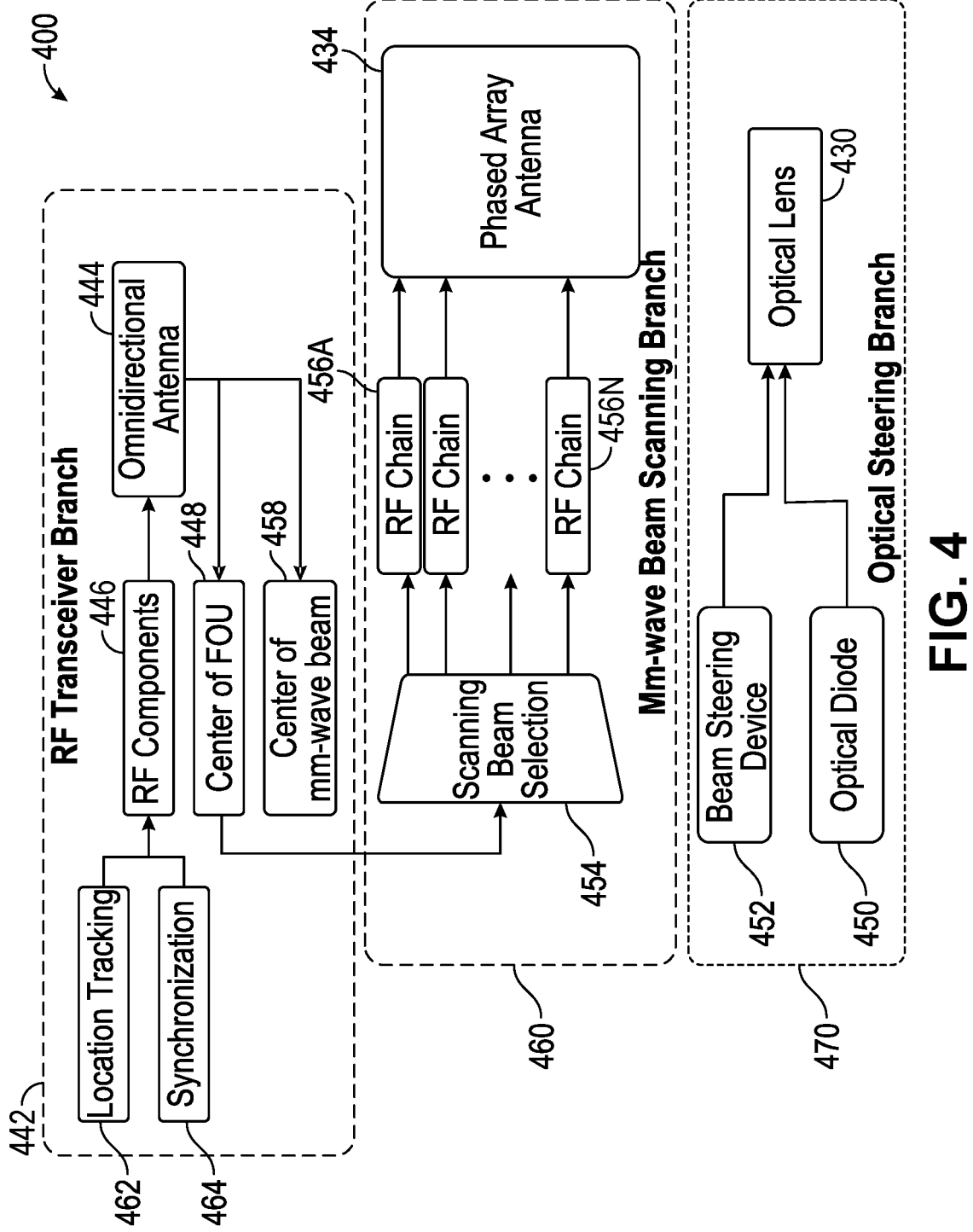
FIG. 4 illustrates generally portions of a system such as included on or within a station, and such as can be used to establish a free-space optical communication link.

FIG. 3 illustrates generally portions of a system such as including or using a non-optical beam 342 and an optical beam 345 to establish a free-space optical communication link. The present inventors have recognized, among other things, that acquisition time can be reduced by if a smaller area (e.g., refined search field 340C) is used for optical scanning, even if using a scanning approach otherwise similar to the technique described in relation to FIG. 2. This smaller area or refined search field 340C can be established by first performing a scan using a scanning approach with a beam having a longer wavelength. For example, as shown illustratively in FIG. 3, a first station 302A can include an optical transmitter 330A and a non-optical transmitter 334A (e.g., a uniform phased array (UPA) antenna). The UPA can be fed by respective sources 332A through 332N, such as amplified and phase shifted to provide a steerable non-optical beam 344. The non-optical beam can be defined in part by a half-power beamwidth 346. The half-power beamwidth 346 of the non-optical beam 342 is larger than that of the optical beam 345, but generally the half-power beamwidth 346 is still much smaller than an initial search field 340B within a potentially broader field of uncertainty 340A. In general, the non-optical beam 342 can be scanned according to a first specified path defined with in the initial search field 340B. A corresponding non-optical receiver 334B at a second station 302B can detect the non-optical beam 342. For example, the second station 302B can transmit a feedback signal (e.g., using a less directional or even omnidirectional RF transmitter) to indicate that the non-optical beam 342 is aligned with the corresponding non-optical receiver 334B. After the initial search field 340B is scanned and a candidate alignment is identified, a refined search field 340C can be established and the optical beam 345 can be scanned according to a second specified scan path to identify an alignment between the optical transmitter 330A and a corresponding optical receiver 330B. Use of the non-optical transmitter 334A to perform initial search can reduce the area of the refined search field 340C, such as reducing an overall acquisition time to achieve alignment between the optical transmitter 330A and a corresponding optical receiver 330B. Generally, as shown and discussed in relation to various examples below, a propagation distance, "d" between stations can affect acquisition time. The use of the non-optical transmitter 334A for the initial search can be referred to as a "coarse" alignment operation, and the use of the optical transmitter 330A for FIG. 4 illustrates generally portions of a system 400 such as included on or within a station, and such as can be used to establish a free-space optical communication link. The system 400 can be a portion of an orbital communications node such as a CubeSat or other orbiting device, as an illustrative example. The system 400 can perform a technique such as shown and described above in relation to FIG. 3, such as to perform a "coarse" acquisition using a non-optical beam, and a "fine" acquisition to align an optical transmitter with an optical receiver to establish the free-space optical communication link. As an illustration, a RF transceiver branch 442 can be included to provide communication between stations, such as using an omnidirectional antenna 444. The omnidirectional antenna can be used by a station to broadcast or receive location data such as provided by a location tracking circuit 462, or to broadcast or receive synchronization data 464 or signals for performing synchronization of respective timebases or frequency references at respective stations, such as can be processed by RF components 446 (e.g., transceiver circuitry). The omnidirectional antenna 444 can be used to receive other data from another station, such indicative of a field of uncertainty 448 to establish an initial search field, or to provide feedback such as indicative of alignment of a non-optical beam, such as an indication that the receiving station is in the center of a mm-wave beam 458.

As discussed in relation to other examples herein, the system 400 can include a non-optical transmitter, such as comprising a mm-wave beam scanning branch 460. A specified scan path for the mm-wave beam scanning branch 460 can include establishing or selecting specified phase shifts using a beam selection circuit 454, such as based on an initial search field corresponding to the field of uncertainty 448. Respective RF signal chains 456A through 456N can drive correspondence elements in a phased array antenna 434. Generally, by establishing respective phase shifts for respective elements in the phased array antenna 434, a resulting beam can be steered through the specified search pattern in a two-dimensional plane until aligned with a receiving station, as indicated by feedback received using the omnidirectional antenna 444.

The system 400 can include an optical system, such as comprising an optical steering branch 470, including a source such as an optical diode 450 (e.g., a laser diode), and a beam steering device 452 (e.g., a mechanical beamsteerer, such as actuated electrically and using electromechanical, piezoelectric transducers, or an array of optical elements such as micromirrors or nanophotonic elements), and an output optical lens 430 structure (such as including one or more lenses or other optical structures to establish an optical transmit field or receiver field of view). The system 400 can perform scanning of an optical beam from the optical lens 430 using a refined, smaller field of interest, such as starting from the alignment established during a coarse search performed using the mm-wave beam scanning branch 460. As mentioned above, such optical beam scanning can include a specified scan path having a spiral shape, such as extending from a central region of the refined field of interest outward.

Figure 5:
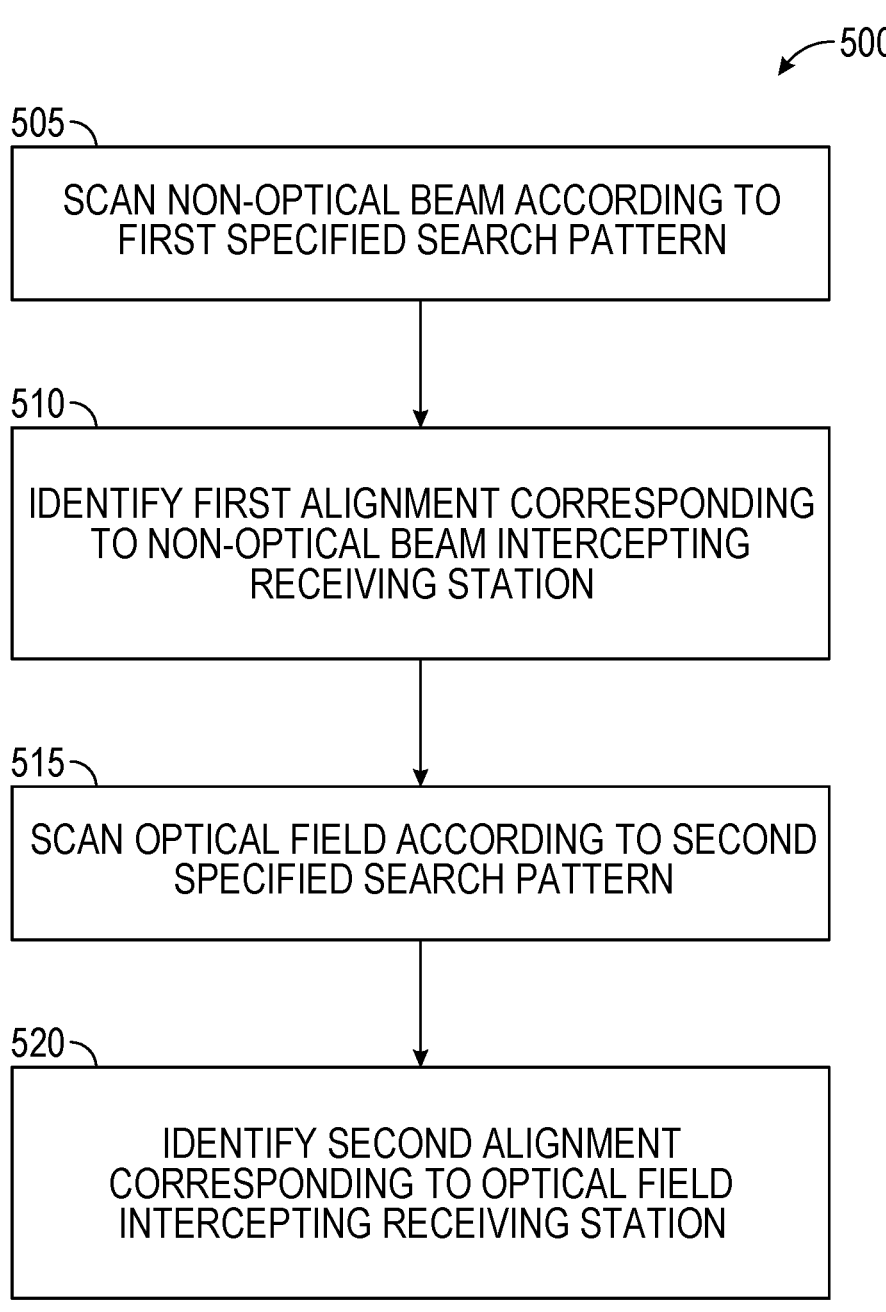
FIG. 5 illustrates generally an illustrative example of a technique, such as a machine-implemented method, that can include a two-stage approach for establishing a free-space optical communication link.

FIG. 5 illustrates generally an illustrative example of a technique 500, such as a machine-implemented method, that can include a two-stage approach for establishing a free-space optical communication link. Similar to the illustrative examples of FIG. 3 and FIG. 4, and other examples herein, the technique 500 can include at 505, scanning a non-optical beam according to a first specified search pattern, such as corresponding to a "coarse" search of an initial field, such as using a mm-wave electronically-steered beam. The phrase "mm-wave" can generally refer to non-optical transmission of an electromagnetic wave having a frequency from a range of about 30 gigahertz to about 300 gigahertz. At 510, a first alignment can be identified, corresponding to the non-optical beam intercepting the receiving station. At 515, an optical field of an optical system can be scanned according to a second specified search pattern. For example, the second specified search pattern can be a finer search pattern defined within a refined search region centered at a location corresponding to the first alignment identified during the coarse search. At 520, a second alignment can be identified corresponding to the optical field intercepting the receiving station. For example, an laser-based optical transmitter can be mechanically scanned until mutually aligned with a receiving input aperture on a receiving station, and a free-space communication link can be established using the identified second alignment. Such coarse and fine alignment operations can be referred to collectively as "acquisition," such including a first "coarse" acquisition using non-optical scanning, and a second "fine" acquisition using optical scanning.

Figure 6:
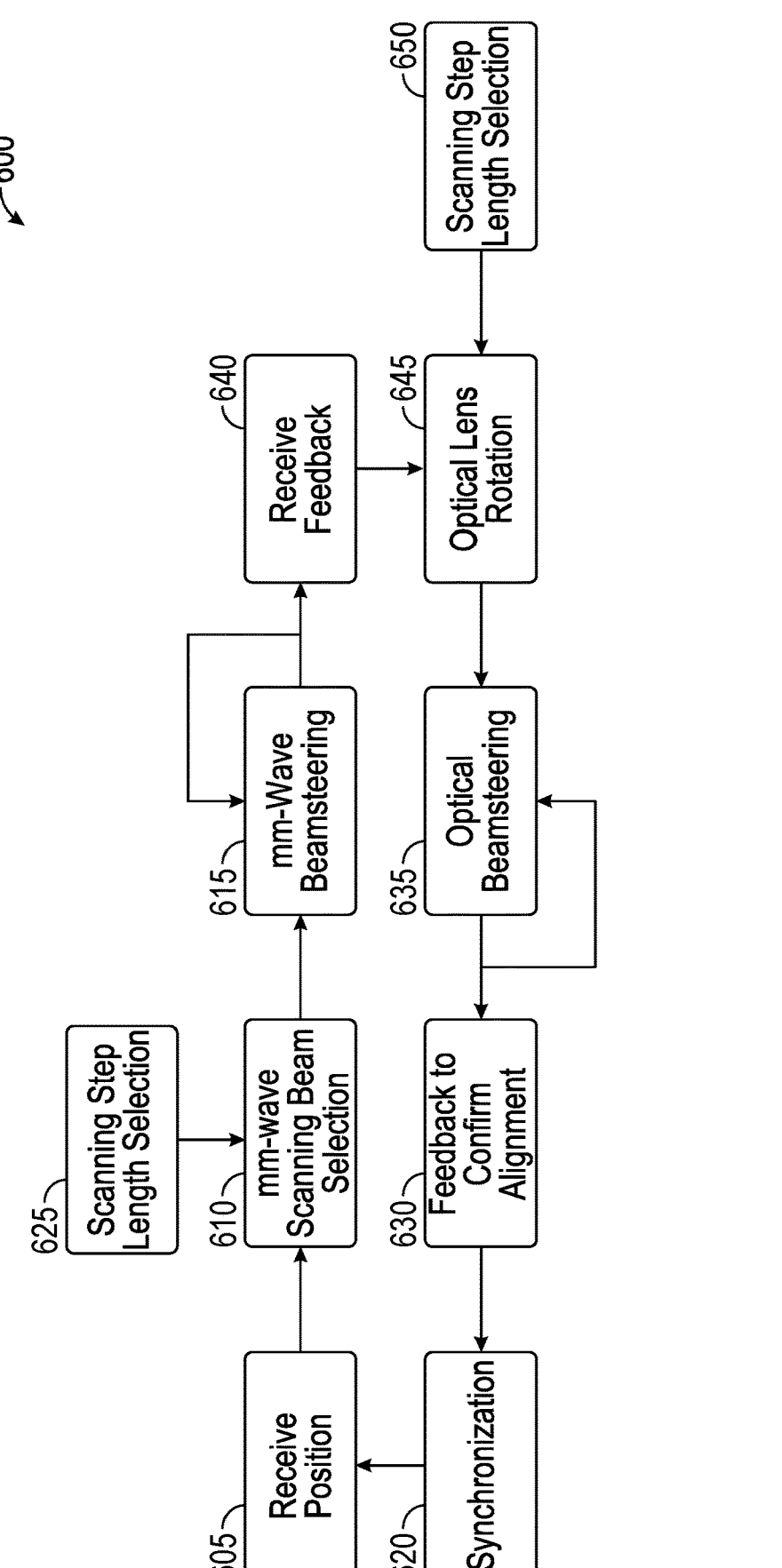
FIG. 6 illustrates generally an example of a technique, such as a machine-implemented method, that can include a two-stage approach for establishing a free-space optical communication link, such as showing other operations.

FIG. 6 illustrates generally an example of a technique 600, such as a machine-implemented method, that can include a two-stage approach for establishing a free-space optical communication link, such as showing other operations. Data indicative of a position of a receiving station can be provided at 605. Parameters for acquisition such as scanning step length selection at 625 and mm-wave (e.g., non-optical) scanning beam selection at 610 can be established, such as using the data provided at 605. For example, scanning beam width, initial direction, angles between each scanning cycle, or other parameters can be selected. At 615, a mm-wave beamsteering operation can be performed to scan an initial field according to a first specified search pattern, such as spirally as mentioned elsewhere herein. At 640, feedback can be received, such as comprising receiving a radio frequency transmission from a receiving station that the mm-wave non-optical beam is aligned with the receiving station. Starting from an alignment established in response to feedback at 640, an optical system can be steered such as by orientation or rotation of an optical lens at 645 to an initial scanning position within a refined search field.

Similar to the step selection at 625, an optical scanning step selection can be established at 650, such as based on acquired feedback at 640 or other data such as position data received at 605. Optical beamsteering can be performed at 635, such as to scan an optical field (e.g., a transmitted beam or a receiver aperture) according to a second specified search pattern. The optical beamsteering at 635 can be performed using the same structure as was used to orient the optical lense at 645 or using another approach. At 630, feedback can be received, such as using a radio frequency link as mentioned above and elsewhere. The feedback can indicate that the optical system is aligned with a corresponding portion of a receiving station, such as to establish a free-space optical communication link using the optical system. Such feedback can also include or be accompanied by other data or signaling for purposes of synchronization at 620 (such as to synchronize or initialize a frequency reference or time base of the system).

Figure 7:
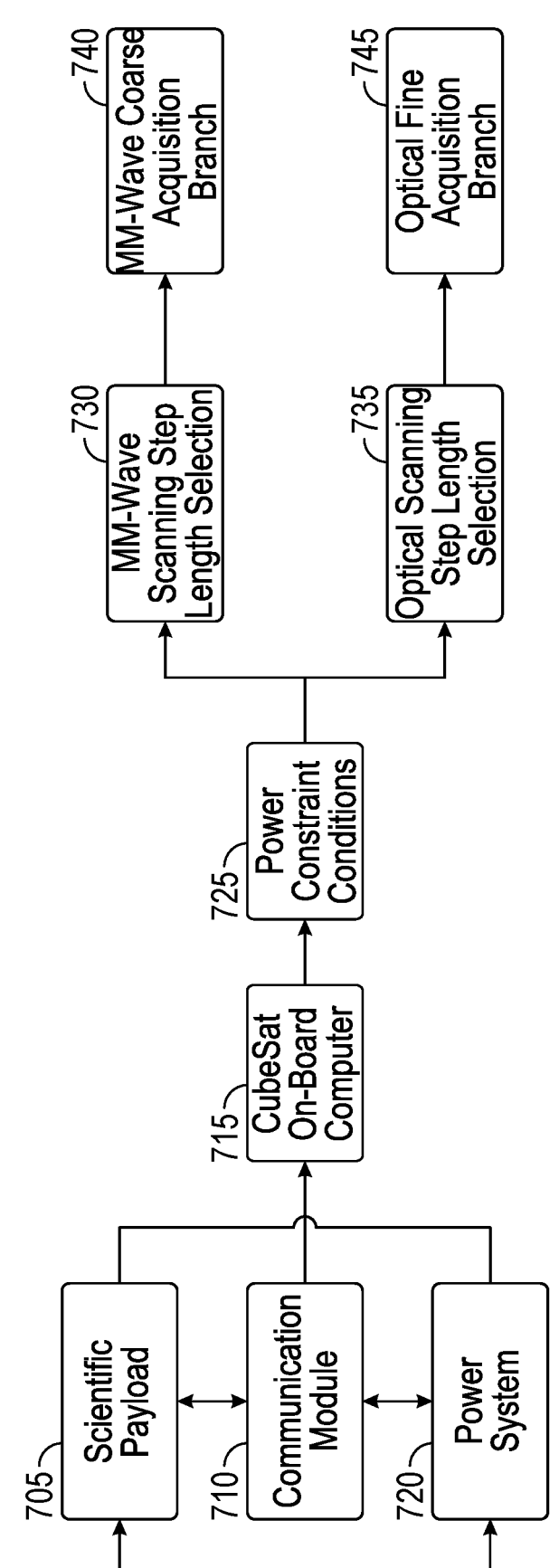
FIG. 7 illustrates generally an example of a system and technique, such as a machine-implemented method, that can include using different scanning step lengths for either a non-optical scan or an optical scan (or both), such as for establishing a free-space optical communication link.

FIG. 7 illustrates generally an example of a system and technique 700, such as a machine-implemented method, that can include using different scanning step lengths for either a non-optical scan or an optical scan (or both), such as for establishing a free-space optical communication link. An on-board embedded system included as a portion of a station (e.g., CubeSat On-Board Computer 715) can be coupled with other elements, such as a scientific payload 705, a communication module 710, and a power system 720. Data indicative of characteristics of one or more of the scientific payload 705, the communication module 710, or the power system 720 can be used to establish power constraint conditions 725. Such conditions can be used, in part, by the CubeSat On-Board Computer 715 to perform selection of mm-wave scanning step length (e.g., angular step or path length for respective scanning steps) at 730, or optical scanning step length at 735, or both. Coarse acquisition can be performed at 740, as shown and described elsewhere herein, such as using mm-wave beamsteering, and fine acquisition can be performed at 745, such as optically using a refined search field. The step selections at 730 and 735 can take into account power constraints, such as presenting a potential tradeoff between acquisition time, acquisition accuracy, and power consumption.

Various parameters related to scanning and acquisition can be analyzed analytically, such as in relation to CubeSat nodes as communication stations. Various factors can influence such analysis, including 1) Distribution of CubeSat positions, 2) Optical beamwidth with regards to propagation distance; 3) UPA antenna configuration, such as related to the mm-wave beamwidth; and 4) Estimated scanning time of acquisition process. A CubeSat can be modeled as a mass dot by comparing its dimensions with a wave propagation distance. A CubeSat rigid body perturbation can be a significant source of receiver position variance, even after broadcasting its location to another station. Position variance can be modeled in a 2D plane due to the relative distance between CubeSats, with perturbation towards transmitter neglected. A position of a CubeSat can be denoted as pi in a satellite constellation with n CubeSats, where $p_i=(x_i, y_i), p_i \in R^2$. The 2D circular plane can define an error boundary in the horizontal and vertical directions. The expression $d_{ij}=\|p_i-p_j\|_2$ indicates a distance between CubeSat i and j for rigid formation, which represents that neighboring CubeSat nodes keep a specified distance from each other. Assuming the position of a CubeSat obeys a Gaussian distribution horizontally and vertically, a probability density function can be defined as $$f(p_{x_i}) = \frac{1}{\sqrt{2\pi}\,\sigma_{x_i}} \exp\left(-\frac{p_{x_i}^2}{2\sigma_{x_i}^2}\right) \tag{1}$$

where $p_{x_i}$ is the horizontal position error of CubeSat i, and $\sigma_{x_i}$ is the horizontal variance. If vertical and horizontal position errors have similar distribution, such as with equal variance and zero mean, a radial error can be modeled as a Rayleigh distribution:

$$f(r_i) = \frac{r_i}{\sigma^2} e^{-r_i^2/(2\sigma^2)}, r_i \geq 0 \tag{2}$$

where $r_i=\sqrt{p_{x_i}^2+p_{y_i}^2}$. A probability of satellite acquisition can be dependent on a radius of a field of uncertainty, $r_U$.

$$P_{acq} = \int_0^{r_U} f(r)dr = 1 - \exp\left(-\frac{r_U^2}{2\sigma^2}\right) \tag{3}$$

A spiral search can be implemented for "coarse" scanning, such as starting from a center of the field of uncertainty. The center is the most likely location of initially acquiring a receiver sensor of another station. A uniform spacing of adjacent portions of the spiral trace can be used, such as using a uniform discrete step length. For example, at a scanning step index k, a specified scan path defined as a trace can be denoted as:

$$r(k) = r(k-1)R_s\theta, \theta \in (0, 2\pi]  \qquad (4)$$

in which, $R_x=R_b(1-\alpha)$ suggests an effective scanning beamwidth, where Rb can represent a transmitter optical beamwidth at the 2D circular plane containing the receiver, and where $$R_b = \frac{\lambda_i d_{ij}}{4\pi r_{bi}}. \qquad (5)$$

The wavelength, $\lambda$, can represent a wavelength of ith transceiver optical signal. The symbol $r_{bi}$ can denote an initial beamwidth from emitter i. The symbol $\alpha$ can represent a factor corresponding to an overlapping area between adjacent beam scanning steps. Such a factor can in part define a scanning precision. As the overlap factor $\alpha$ becomes greater, a corresponding unscanned area is reduced, as discussed above generally in relation to FIG. 1. Conversely, an unscanned area increases with the increment of $R_s$ when $\alpha=0$. The overlap factor $\alpha$ can also be related to a propagation distance $d_{ij}$ between the transmitting and receiving stations.

$$\alpha = 1 - \frac{b}{d_{ij}} \qquad (6)$$

A constant b can be related to a position of a focal point between transmitter and receiver. With a larger propagation distance $d_{ij}$, scanning beamwidth generally increases. EQ. 4, above, shows generally that fewer scanning steps k can be used when a larger scanning beamwidth is used, which corresponds to less acquisition time versus a smaller beamwidth. Accordingly, as discussed elsewhere herein, use of a longer-wavelength technique, such as phased array antenna operating at mm-range wavelength can be applied to provide a coarse beam alignment, such as to guide a later optical acquisition. A half power beamwidth (HPBW) can be used to establish a scanning beamwidth. For a uniform phased array (UPA) planar antenna with rectangular distribution, the half power beamwidth can be represented as $$\theta_h = \frac{180a\lambda_{upa}}{\pi d} \qquad (7)$$

where $\lambda_{upa}$ refers to the UPA antenna wavelength, d can represent a dimension of aperture length of the UPA antenna, and a denotes an azimuth broadening factor. EQ. 7 illustrates generally that a larger antenna aperture generates a narrower pencil beam for the scanning. For example, a mm-wave pencil beam becomes sharper due to the narrower steering angle, however, such a pencil beam still comprises a larger beamwidth than corresponding optical radiation at the circular field of uncertainty of the receiver.

Respective scanning step times $\delta_t$ for an emitter CubeSat can be modeled to include a receiver sensing, processing time, and dwell time caused by EM wave propagation. For simplification, only dwell time is considered in each scanning step k, with simplified dwell time defined as:

$$\delta t = 2\frac{d_{ij}}{c} \qquad (8)$$

Scanning time can be modeled as a ratio between uncertain field area and scanning beam area, such as represented by $$T_S = \frac{r^2 d_{ij}^2}{R_b^2 b^2}\delta t \qquad (9)$$

where EQ. 5 and EQ. 8 can be substituted in EQ. 9 to provide:

$$T_S = \frac{8\pi r^2 d_{ij}^2 r_{bi}}{\lambda_i c} \qquad (10)$$

in which scanning time is generally proportional to a transmission distance and radius of scanning based on initial beamwidth and wavelength.

Assuming N potential CubeSat positions with N broadcasting periods, a statistical acquisition time can be determined according to an expected value. For example, each scanning period can be averaged with the acquisition probability of CubeSat position, with such expectation modeled as:

$$ET_s = P_{acq}\int_0^{T_U} T_S(r)\,dr \qquad (11)$$

If EQ. 11 is substituted in EQ. 10, a Mean Acquisition Time (MAT) with regard to a pair of CubeSat notes separated by a distance dij can be modeled as $$ET_s = \left(1 - e^{\frac{-r_U^2}{2\sigma^2}}\right)\left(\frac{8\pi r_{b_i} d_{ij} r_U^3}{3\lambda_i c}\right) \qquad (12)$$

where c is the speed of light.

Figure 8A:
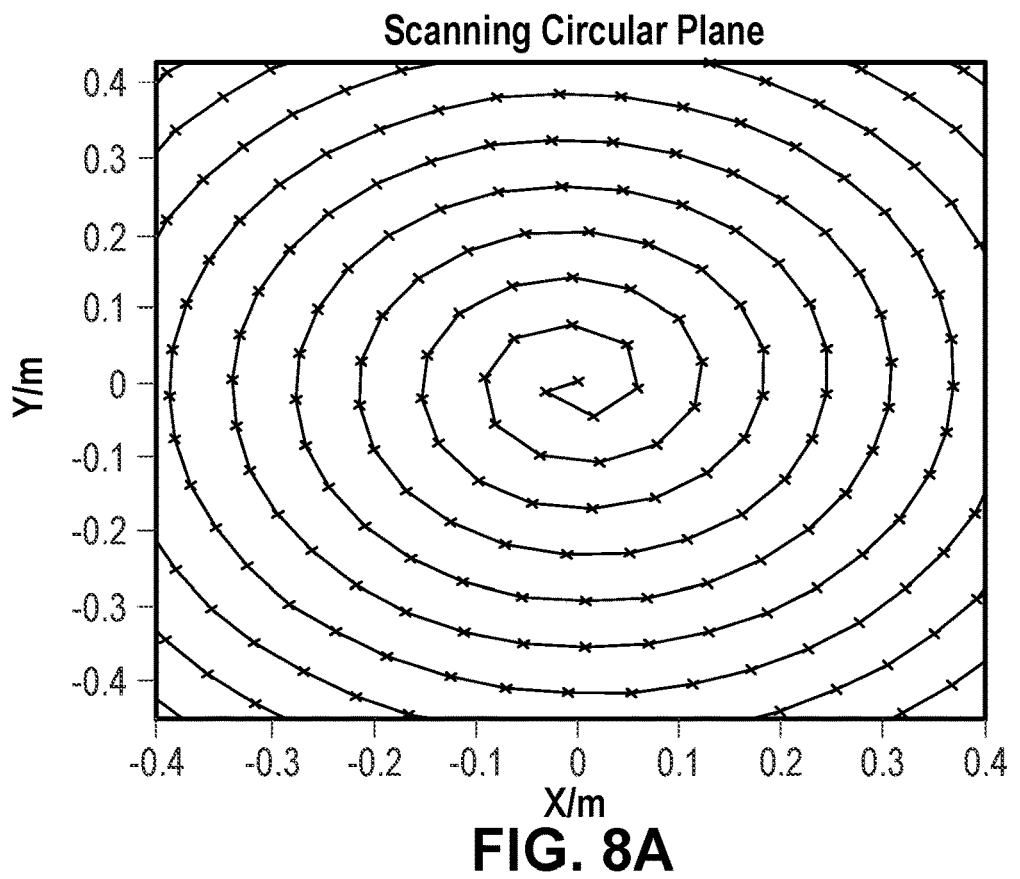
FIG. 8A shows an illustrative example of a spiral scan path, such as can be followed by aiming an optical system in order to establish a free-space optical communication link.
Figure 8B:
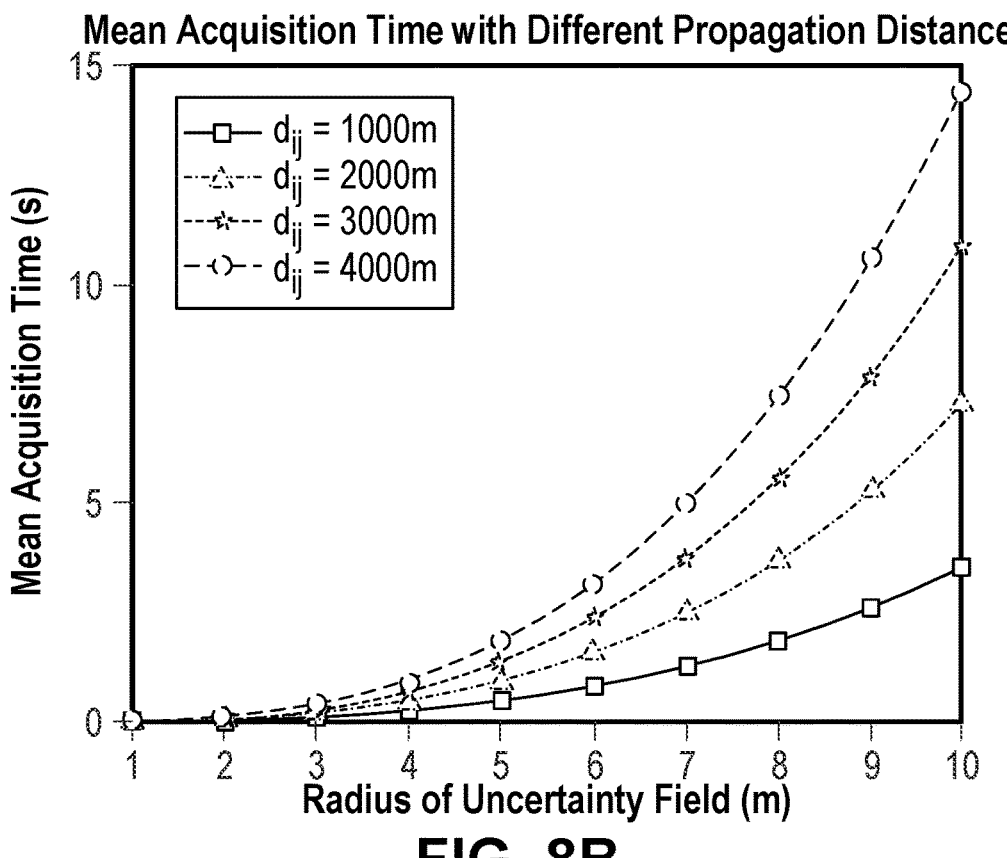
FIG. 8B shows illustrative examples of mean acquisition times for different propagation distances, such as when a scan path similar to FIG. 8A is used.

FIG. 8A shows an illustrative example of a spiral scan path, such as can be followed by aiming an optical system in order to establish a free-space optical communication link and FIG. 8B shows illustrative examples of mean acquisition times for different propagation distances, such as when a scan path similar to FIG. 8A is used. Mean Acquisition Times (MATs) shown in FIG. 8B are computed using the analysis discussed above. In FIG. 8B, a radius of the field of uncertainty and corresponding simulated MAT is shown for different propagation distances between emitter and receiver. One scanning period refers to duration for a circular optical beam to move spirally until a modeled receiver "dot" is located within the radius of the optical beam. Time of acquisition indicates a scanning time of optical beam with or without the guidance of mm-wave signal. Generally, modeled average acquisition times are calculated based on an average value of scanning time for each potential receiver position in the field of uncertainty (FOU). The random positions following Gaussian distribution are assigned within FOU, in which the position can be determined by either the HPBW of UPA antenna defined as a 3 dB contour or by receiving feedback through another channel such as broadcasted omnidirectionally. As an illustration, referring back to FIG. 8A, a spiral scanning plane is shown within an FOU of a receiver. Each cross sign represents a discrete scan position of the emitted scanning beam. Equal horizontal and vertical space between each turn of scanning assist in reducing the unscanned field as discussed elsewhere herein.

FIG. 8B shows the MAT in terms of a fixed radius of the FOU plane and overlapping factor α=0.5 for different distances (e.g., 1 km to 4 km) and different radii of an uncertainty field. A distance between orbiting CubeSat can be in the range of 1 km to 10 km or even greater. Such a distance can also be affected by the formation flying topology, which usually adopts three ways, namely leader-follower, cluster, or distributed constellation, as illustrative examples. The simulation used for FIG. 8B assumes a leader-follower orbiting topology. A cost of scanning increases with emitter to receiver distance. For example, MAT increases exponentially with FOU radius. Generally, detection of an object that is further away involves a larger area to scan, leading to a longer detection time. In the example of FIG. 8B, a coarse acquisition with a non-optical beam is not performed prior to optical acquisition.

Figure 9A:
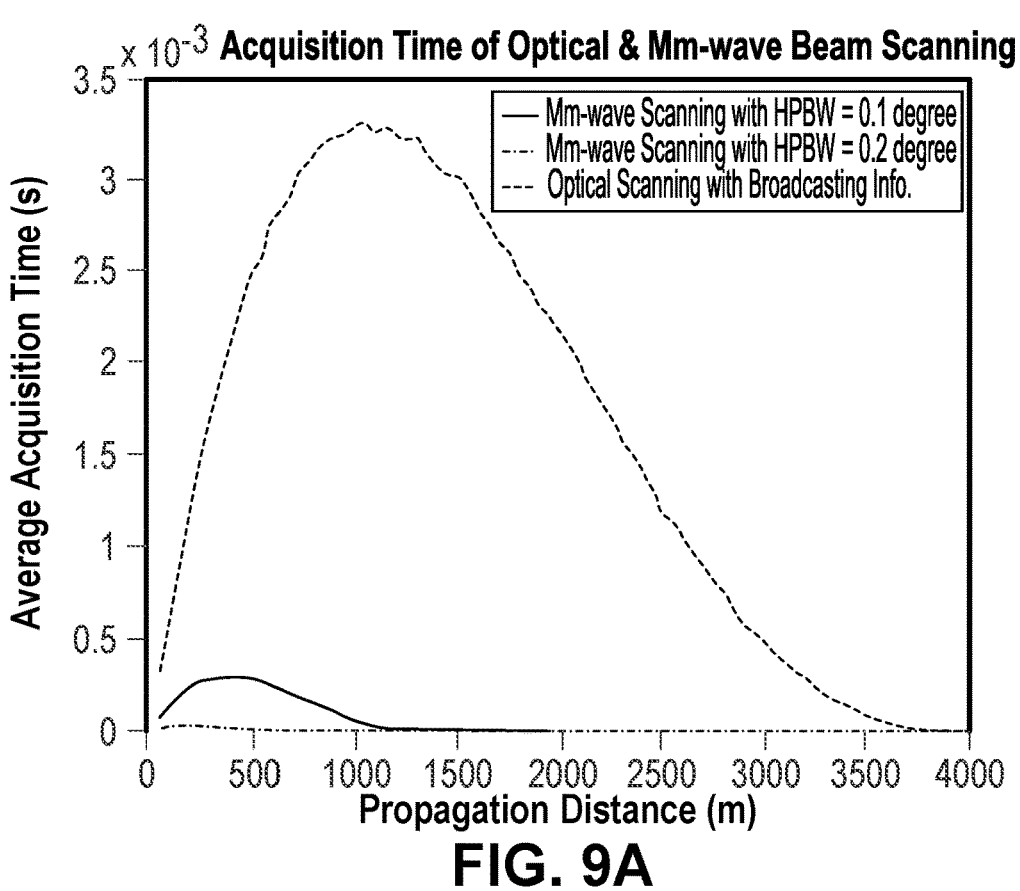
FIG. 9A shows illustrative examples of mean acquisition times for different propagation distances, for non-optical (e.g., mm-wave scanning) having two different half-power beamwidths (HPBWs), and for optical scanning.

FIG. 9A shows illustrative examples of mean acquisition times for different propagation distances, for non-optical (e.g., mm-wave scanning) having two different half-power beamwidths (HPBWs), and for optical scanning. In FIG. 9A, average acquisition times are simulated using parameters N=1000, M=2, $\lambda_i$=1550 nm, b=70, $r_{bi}$=2 mm, and $R_{U}$=5 m. We compare the pure optical beam acquisition with mm-wave steering scanning with a UPA antenna. A reduction of overall acquisition time is achieved by using mm-wave beam scanning to provide a "coarse" acquisition. Compared to fixed overlapping factor, using an adaptive value of a can also reduce AAT as propagation distance increase. Such an adaptive overlap a can be used for either optical or non-optical scanning, or both. A reduction of AAT in relation to HPBW is shown in the mm-wave alignment, which has larger beamwidth than optical scanning. For station-to-station (e.g., CubeSat to Cubesat) optical communication, a beam alignment efficiency can be adjusted based on a scanning beamwidth and distance between transmitter and receiver.

Figure 9B:
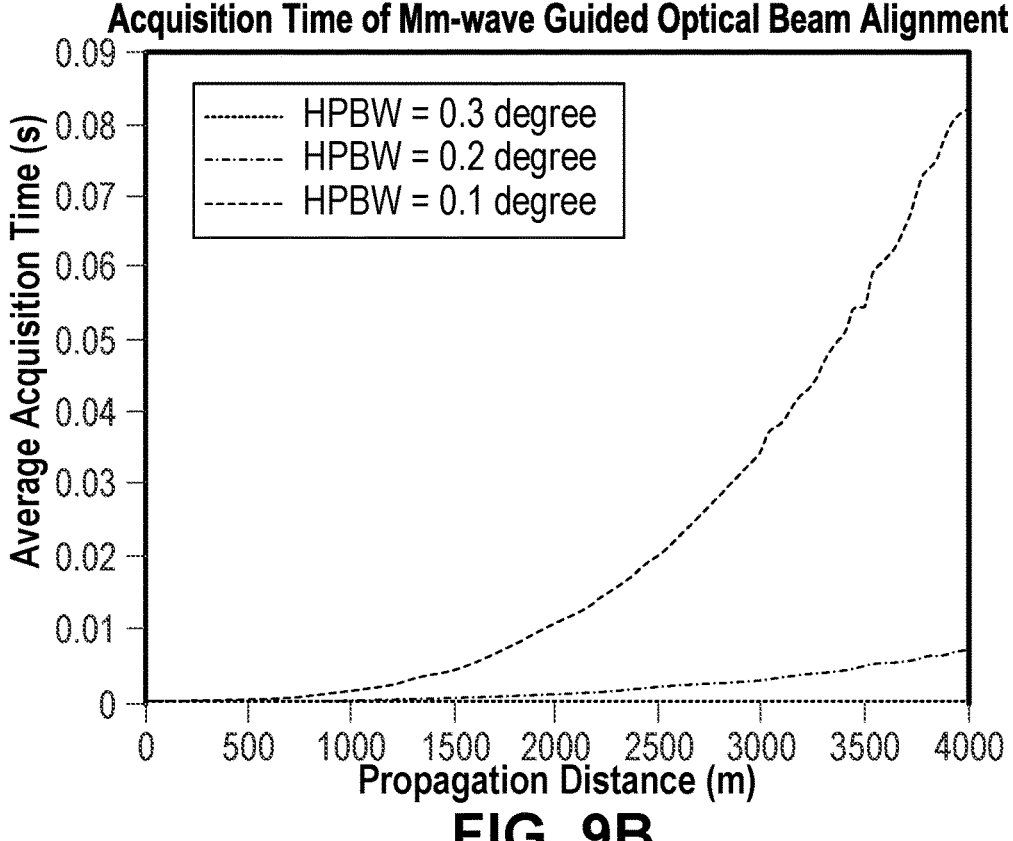
FIG. 9B shows illustrative examples of mean acquisition times for different propagation distances, for optical scanning after an initial alignment using non-optical scanning (e.g., coarse guidance using mm-wave scanning), for different HPBWs used for the mm-wave scanning.

FIG. 9B shows illustrative examples of mean acquisition times for different propagation distances, for optical scanning after an initial alignment using non-optical scanning (e.g., coarse guidance using mm-wave scanning), for different HPBWs used for the mm-wave scanning. Generally, as discussed above, a "pencil" beamwidth defined by a 3 dB contour can provide a coarse alignment using a non-optical beam to guide later optical acquisition. Using a known HPBW, an aperture of a UPA could be determined. For example, assuming an azimuth broadening factor α=1, and a UPA antenna wavelength of 0.001 m, an aperture of a UPA can be determined as 0.19 m, 0.28 m, 0.57 m corresponded to HPBWs of 0.3 degrees, 0.2 degrees, and 0.1 degrees, respectively. By spacing the antenna elements using a half wavelength pitch, a count of antenna elements on a UPA plane can be 1140, 560, or 380 elements, respectively.

Figure 10:
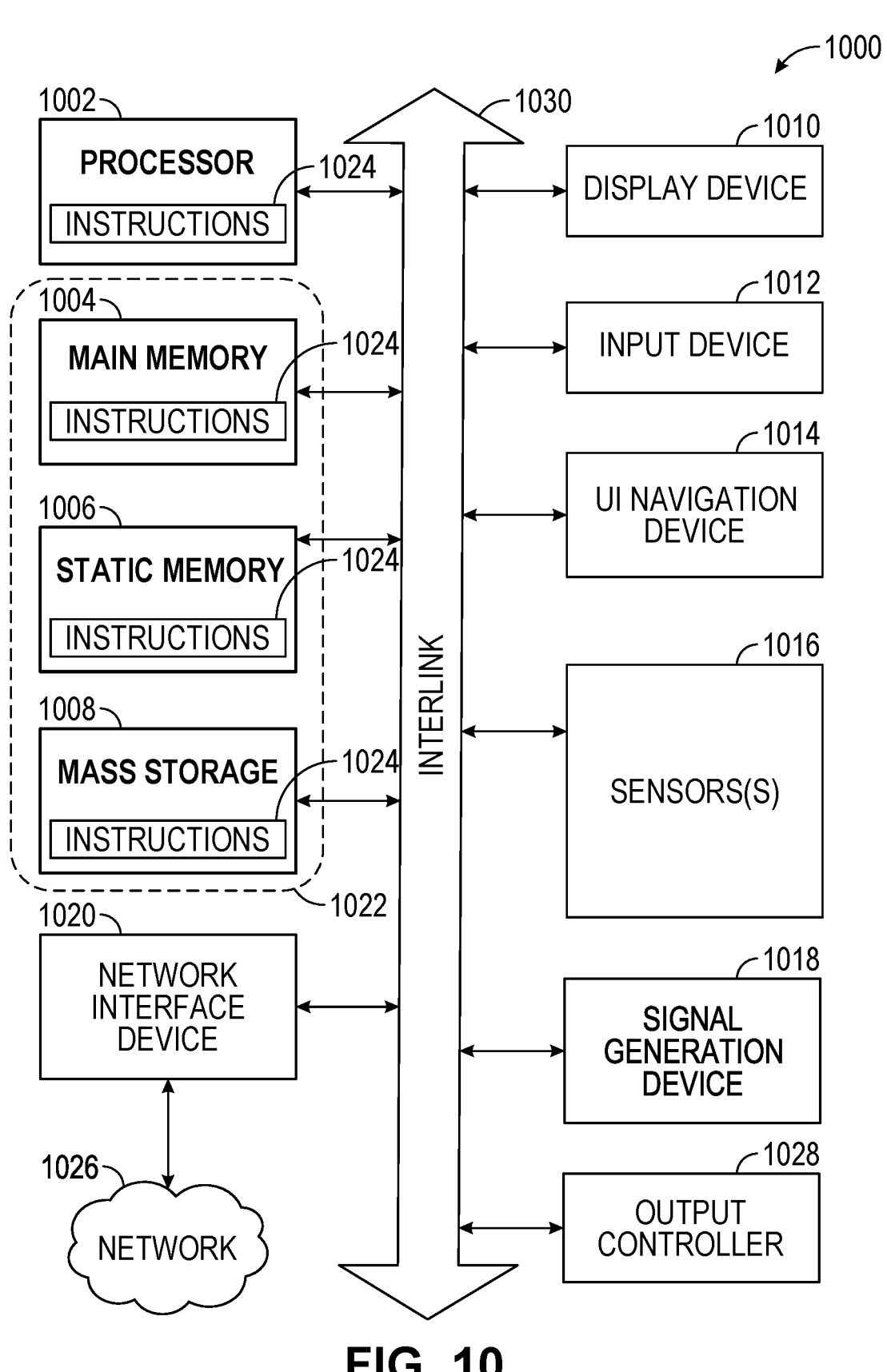
FIG. 10 illustrates a block diagram of an example comprising a machine upon which any one or more of the techniques (e.g., methodologies) discussed herein may be performed.

FIG. 10 illustrates a block diagram of an example comprising a machine 1000 upon which any one or more of the techniques (e.g., methodologies) discussed herein may be performed. Machine 1000 (e.g., computer system) may include a hardware processor 1002 (e.g., a central processing unit (CPU), a graphics processing unit (GPU), a hardware processor core, or any combination thereof), a main memory 1004 and a static memory 1006, connected via an interlink 1030 (e.g., link or bus), as some or all of these components may constitute hardware for systems or related implementations discussed above.

Specific examples of main memory 1004 include Random Access Memory (RAM), and semiconductor memory devices, which may include storage locations in semiconductors such as registers. Specific examples of static memory 1006 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; or optical media such as CD-ROM and DVD-ROM disks.

The machine 1000 may further include a display device 1010, an input device 1012 (e.g., a keyboard), and a user interface (UI) navigation device 1014 (e.g., a mouse). In an example, the display device 1010, input device 1012, and UI navigation device 1014 may be a touch-screen display. The machine 1000 may include a mass storage device 1008 (e.g., drive unit), a signal generation device 1018 (e.g., a speaker), a network interface device 1020, and one or more sensors 1016, such as a global positioning system (GPS) sensor, compass, accelerometer, or some other sensor. The machine 1000 may include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The mass storage device 1008 may comprise a machine-readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within static memory 1006, or within the hardware processor 1002 during execution thereof by the machine 1000. In an example, one or any combination of the hardware processor 1002, the main memory 1004, the static memory 1006, or the mass storage device 1008 comprises a machine readable medium.

Specific examples of machine-readable media include, one or more of non-volatile memory, such as semiconductor memory devices (e.g., EPROM or EEPROM) and flash memory devices; magnetic disks, such as internal hard disks and removable disks; magneto-optical disks; RAM; or optical media such as CD-ROM and DVD-ROM disks. While the machine-readable medium is illustrated as a single medium, the term "machine readable medium" may include a single medium or multiple media (e.g., a centralized or distributed database, or associated caches and servers) configured to store the one or more instructions 1024.

An apparatus of the machine 1000 includes one or more of a hardware processor 1002 (e.g., a central processing unit (CPU), a graphics processing unit (GPU), a hardware processor core, or any combination thereof), a main memory 1004 and a static memory 1006, sensors 1016, network interface device 1020, antennas, a display device 1010, an input device 1012, a UI navigation device 1014, a mass storage device 1008, instructions 1024, a signal generation device 1018, or an output controller 1028. The apparatus may be configured to perform one or more of the methods or operations disclosed herein.

The term "machine readable medium" includes, for example, any medium that is capable of storing, encoding, or carrying instructions for execution by the machine 1000 and that cause the machine 1000 to perform any one or more of the techniques of the present disclosure or causes another apparatus or system to perform any one or more of the techniques, or that is capable of storing, encoding or carrying data structures used by or associated with such instructions. Non-limiting machine-readable medium examples include solid-state memories, optical media, or magnetic media. Specific examples of machine-readable media include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); or optical media such as CD-ROM and DVD-ROM disks. In some examples, machine readable media includes non-transitory machine-readable media. In some examples, machine readable media includes machine readable media that is not a transitory propagating signal.

The instructions 1024 may be transmitted or received, for example, over a communications network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc.). Example communication networks include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®), IEEE 802.15.4 family of standards, a Long Term Evolution (LTE) 4G or 5G family of standards, a Universal Mobile Telecommunications System (UMTS) family of standards, peer-to-peer (P2P) networks, satellite communication networks, among others.

In an example, the network interface device 1020 includes one or more physical jacks (e.g., Ethernet, coaxial, or other interconnection) or one or more antennas to access the communications network 1026. In an example, the network interface device 1020 includes one or more antennas to wirelessly communicate using at least one of single-input multiple-output (SIMO), multiple-input multiple-output (MIMO), or multiple-input single-output (MISO) techniques. In some examples, the network interface device 1020 wirelessly communicates using Multiple User MIMO techniques. The term "transmission medium" shall be taken to include any intangible medium that is capable of storing, encoding or carrying instructions for execution by the machine 1000, and includes digital or analog communications signals or other intangible medium to facilitate communication of such software.

VARIOUS NOTES

Each of the non-limiting aspects below, labeled as "clauses," can stand on its own or can be combined in various permutations or combinations with one or more of the other aspects or other subject matter described in this document.

Clause 1. A machine-implemented method for establishing a free-space optical communication link between stations, the machine-implemented method comprising: determining an initial search field for use by a first station in establishing the free-space optical communication link with a second station, scanning a non-optical beam from a non-optical wireless transmitter of the first station according to a first specified search pattern within the initial search field, receiving a first indication from the second station that the non-optical beam has intercepted the second station, using data about the received first indication from the second station to establishing a refined search field for use by the first station in establishing the free-space optical communication link with the second station, scanning an optical field of an optical system of the first station according to a second specified search pattern within the refined search field, and receiving a second indication from the second station that the optical field is aligned with an optical system of the second station.

Clause 2. The machine-implemented method of clause 1, wherein the scanning the optical field of the optical system of the first system comprises scanning a transmitted optical beam, and wherein the receiving the second indication from the second station comprises receiving an indication that the transmitted optical beam of the first station is aligned with an optical receiver of the second station.

Clause 3. The machine-implemented method of clause 2, wherein free-space optical communication is established when the transmitted optical beam of the first station is aligned with the optical receiver of the second station.

Clause 4. The machine-implemented method of clause 3, wherein the transmitted optical beam is generated using a laser; and wherein the free-space optical communication is laser-based.

Clause 5. The machine-implemented method of any of clauses 1 through 4, wherein the non-optical beam is scanned electronically.

Clause 6. The machine-implemented method of clause 5, wherein the non-optical beam is generated using a phased array antenna structure operating in millimeter wavelength range.

Clause 7. The machine-implemented method of clause 6, wherein the millimeter wavelength range is defined by one or more frequencies within a range of about 30 gigahertz to about 300 gigahertz.

Clause 8. The machine-implemented method of any of clauses 1 through 7, wherein the optical field is scanned mechanically.

Clause 9. The machine-implemented method of any of clauses 1 through 8, wherein determining the initial search field for use by the first station comprises receiving position data corresponding to a position of the second station.

Clause 10. The machine-implemented method of any of clauses 1 through 9, wherein the receiving at least one of the first or second indications comprises receiving a non-optical wireless transmission from the second station.

Clause 11. The machine-implemented method of any of clauses 1 through 10, wherein at least one of the first specified search pattern or the second specified search pattern comprises a spiral pattern.

Clause 12. The machine-implemented method of any of clauses 1 through 11, wherein the scanning the non-optical beam according to the first specified search pattern defines a coarse search; and wherein the scanning the optical field according to the second specified search pattern defines a fine search as compared to the coarse search.

Clause 13. The machine-implemented method of any of clauses 1 through 12, wherein the first station and the second station comprise: respective radio frequency transceivers; respective non-optical wireless transceivers separate from the respective radio frequency transceivers; and respective optical systems to perform optical communication using the free-space optical communication link.

Clause 14. A machine-implemented method for establishing a free-space optical communication link between stations, the machine-implemented method comprising, at a transmitting station, scanning a non-optical beam according to a first specified search pattern within an initial search field, identifying a first alignment corresponding to the non-optical beam intercepting a receiving station, at the transmitting station, scanning an optical field according to a second specified search pattern within a refined search field, the refined search field established at least in part using the identified alignment, and identifying a second alignment corresponding to the optical field intercepting the receiving station.

Clause 15. The machine-implemented method of clause 14, comprising initiating free-space optical communication between the transmitting station and the receiving station using the second alignment.

Clause 16. An apparatus for establishing a free-space optical communication link between stations, such as can include performing one or more operations of the machine-implemented methods of any of clauses 1 through 15. The apparatus can include a first station comprising a first non-optical wireless transmitter configured to steer a non-optical beam according to a first specified search pattern within an initial search field, a first radio frequency transceiver configured to receive a first indication from a second station that the non-optical beam has intercepted the second station, and a first optical system configured to provide scanning of an optical field according to a second specified search pattern within a refined search field, the refined search field established using the first indication, wherein the first station is configured to establish the free-space optical communication link when the optical field is aligned with the second station, and wherein the free-space optical communication link is laser-based.

Clause 17. The apparatus of clause 16, wherein at least one of the first specified search pattern or the second specified search pattern comprises a spiral pattern.

Clause 18. The apparatus of any of clauses 16 or 17, further comprising the second station.

Clause 19. The apparatus of clause 18, wherein the second station comprises a second radio frequency transceiver configured to transmit data for use by the first station in determining the initial search field.

Clause 20. The apparatus of clause 19, wherein the second radio frequency transceiver is configured to transmit the first indication; wherein the second radio frequency transceiver is configured to transmit a second indication indicating that the optical field is aligned with an optical system of the second station; and wherein the first radio frequency transceiver is configured to receive the second indication.

The above detailed description includes references to the accompanying drawings, which form a part of the detailed description. The drawings show, by way of illustration, specific embodiments in which the invention can be practiced. These embodiments are also referred to generally as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc., are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Such instructions can be read and executed by one or more processors to enable performance of operations comprising a method, for example. The instructions are in any suitable form, such as but not limited to source code, compiled code, interpreted code, executable code, static code, dynamic code, and the like.

Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A machine-implemented method for establishing a free-space optical communication link between stations, the machine-implemented method comprising:

determining an initial search field for use by a first station in establishing the free-space optical communication link with a second station;

scanning a non-optical beam from a non-optical wireless transmitter of the first station according to a first specified search pattern within the initial search field;

receiving a first indication from the second station that the non-optical beam has intercepted the second station;

using data about the received first indication from the second station to establishing a refined search field for use by the first station in establishing the free-space optical communication link with the second station;

scanning an optical field of an optical system of the first station according to a second specified search pattern within the refined search field; and receiving a second indication from the second station that the optical field is aligned with an optical system of the second station;

wherein the second station comprises a second radio frequency transceiver configured to transmit data for use by the first station in determining the initial search field including the second indication indicating that the optical field is aligned with an optical system of the second station; and wherein the first station is configured to receive the second indication using a first radio frequency transceiver.

2. The machine-implemented method of claim 1, wherein the scanning the optical field of the optical system of the first station comprises scanning a transmitted optical beam; and wherein the receiving the second indication from the second station comprises receiving an indication that the transmitted optical beam of the first station is aligned with an optical receiver of the second station.

3. The machine-implemented method of claim 2, wherein free-space optical communication is established when the transmitted optical beam of the first station is aligned with the optical receiver of the second station.

4. The machine-implemented method of claim 3, wherein the transmitted optical beam is generated using a laser; and wherein the free-space optical communication is laser-based.

5. The machine-implemented method of claim 1, wherein the non-optical beam is scanned electronically.

6. The machine-implemented method of claim 5, wherein the non-optical beam is generated using a phased array antenna structure operating in millimeter wavelength range.

7. The machine-implemented method of claim 6, wherein the millimeter wavelength range is defined by one or more frequencies within a range of about 30 gigahertz to about 300 gigahertz.

8. The machine-implemented method of claim 1, wherein the optical field is scanned mechanically.

9. The machine-implemented method of claim 1, wherein determining the initial search field for use by the first station comprises receiving position data corresponding to a position of the second station.

10. The machine-implemented method of claim 1, wherein at least one of the first specified search pattern or the second specified search pattern comprises a spiral pattern.

11. The machine-implemented method of claim 1, wherein the scanning the non-optical beam according to the first specified search pattern defines a coarse search; and wherein the scanning the optical field according to the second specified search pattern defines a fine search as compared to the coarse search.

12. The machine-implemented method of claim 1, wherein the first station and the second station comprise:

respective non-optical wireless transceivers separate from the respective first and second radio frequency transceivers; and respective optical systems to perform optical communication using the free-space optical communication link.

13. An apparatus for establishing a free-space optical communication link between stations, the apparatus comprising:

a first station comprising:

a first non-optical wireless transmitter configured to steer a non-optical beam according to a first specified search pattern within an initial search field;

a first radio frequency transceiver configured to receive a first indication from a second station that the non-optical beam has intercepted the second station;

a first optical system configured to provide scanning of an optical field according to a second specified search pattern within a refined search field, the refined search field established using the first indication; and a second station comprising a second radio frequency transceiver configured to transmit data for use by the first station in determining the initial search field;

wherein the first station is configured to establish the free-space optical communication link when the optical field is aligned with the second station;

wherein the second radio frequency transceiver is configured to transmit a second indication indicating that the optical field is aligned with an optical system of the second station; and wherein the first radio frequency transceiver is configured to receive the second indication;

wherein the free-space optical communication link is laser-based.

14. The apparatus of claim 13, wherein at least one of the first specified search pattern or the second specified search pattern comprises a spiral pattern.

15. The apparatus of claim 13, wherein the non-optical beam is steered electronically.

16. The apparatus of claim 15, wherein the first non-optical wireless transmitter is configured to generate the non-optical beam using a phased array antenna structure configured to operate in a millimeter wavelength range.

17. The apparatus of claim 16, wherein the millimeter wavelength range is defined by one or more frequencies within a range of about 30 gigahertz to about 300 gigahertz.

18. The apparatus of claim 13, wherein the first optical system is configured to scan the optical field mechanically.

19. The apparatus of claim 13, wherein at least one of the first specified search pattern or the second specified search pattern comprises a spiral pattern.

20. The apparatus of claim 13, wherein the first specified search pattern defines a coarse search; and wherein the second specified search pattern defines a fine search as compared to the coarse search.

\* \* \* \* \*